(12) United States Patent
Coleman et al.

(10) Patent No.: US 10,851,893 B2
(45) Date of Patent: Dec. 1, 2020

(54) PISTON ARRANGEMENT

(71) Applicant: Westport Power Inc., Vancouver (CA)

(72) Inventors: Timothy S. Coleman, Vancouver (CA); Alan R. Stockner, Metamora, IL (US); Dana R. Coldren, Secor, IL (US)

(73) Assignee: WESTPORT POWER INC., Vancouver (CA)

( * ) Notice: Subject to any disclaimer, the term of this patent is extended or adjusted under 35 U.S.C. 154(b) by 55 days.

(21) Appl. No.: 15/509,420

(22) PCT Filed: Sep. 4, 2015

(86) PCT No.: PCT/CA2015/050859
§ 371 (c)(1),
(2) Date: Mar. 7, 2017

(87) PCT Pub. No.: WO2016/037270
PCT Pub. Date: Mar. 17, 2016

(65) Prior Publication Data
US 2017/0254417 A1    Sep. 7, 2017

Related U.S. Application Data

(60) Provisional application No. 62/047,635, filed on Sep. 8, 2014.

(51) Int. Cl.
*F16J 1/09* (2006.01)
*F16J 9/12* (2006.01)

(52) U.S. Cl.
CPC .. *F16J 1/09* (2013.01); *F16J 9/12* (2013.01)

(58) Field of Classification Search
CPC ..... F16J 9/12; F16J 1/09; F15B 11/161; F02F 5/00
See application file for complete search history.

(56) References Cited

U.S. PATENT DOCUMENTS

| | | |
|---|---|---|
| 2008/0229922 A1 | 9/2008 | Lahrman et al. |
| 2012/0112415 A1 | 5/2012 | Benjamin et al. |
| 2013/0234401 A1 | 9/2013 | Smith |

FOREIGN PATENT DOCUMENTS

| | | |
|---|---|---|
| CN | 1250505 A | 4/2000 |
| CN | 102900559 A | 4/2016 |

(Continued)

OTHER PUBLICATIONS

International Search Report and Written Opinion of the International Searching Authority, dated Dec. 4, 2015.

(Continued)

*Primary Examiner* — Abiy Teka
(74) *Attorney, Agent, or Firm* — Carie C. Mager

(57) ABSTRACT

A piston arrangement comprises a circumferential piston groove that can accommodate a seal for sealing between the piston and the cylinder bore when the piston moves in a reciprocal movement. The piston arrangement comprises a first fluid flow passage, defined at least in part by the piston body that fluidly connects the forward side of the cylinder bore with a space within the piston groove underneath the seal and a second fluid flow passage, defined in part by the piston body, which fluidly connects the rear side of the cylinder bore with the space within the piston groove underneath the seal. The two fluid flow passages allow a controlled fluid flow around the piston seal and comprise a channel provided in a lateral wall of the piston groove or an orifice provided in the piston body.

20 Claims, 7 Drawing Sheets

(56) References Cited

FOREIGN PATENT DOCUMENTS

| | | |
|---|---|---|
| DE | 19514918 A1 | 10/1996 |
| EP | 2017506 A3 | 7/2008 |
| GB | 2104621 A | 3/1983 |
| JP | 411201283 A | 7/1999 |
| WO | 9841749 A1 | 9/1998 |
| WO | WO 9841749 A1 * | 9/1998 ............... F02F 3/00 |

OTHER PUBLICATIONS

SIPO Search Report (English Translation) in corresponding CN Application, dated Feb. 24, 2018.
SIPO First Office Action with English Translation in corresponding CN Application, dated Feb. 24, 2018.
EPO Extended Search Report in corresponding EP Application, dated Apr. 3, 2018.
AU Patent Office First Office Action, dated Jun. 27, 2018.
Australian Patent Office Notice of Acceptance (along with Allowed Specification including Claims) dated Jul. 3, 2019.

* cited by examiner

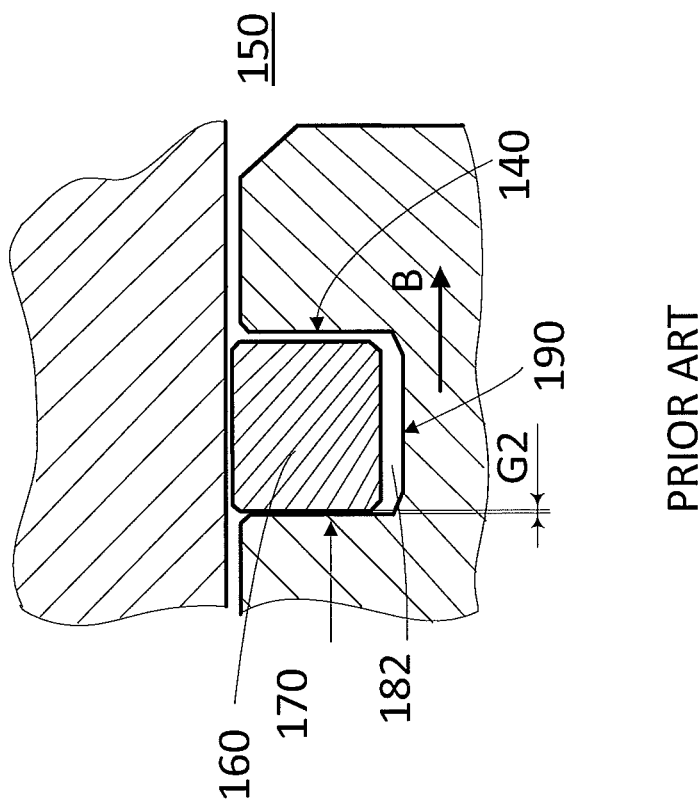
FIGURE 1B
PRIOR ART
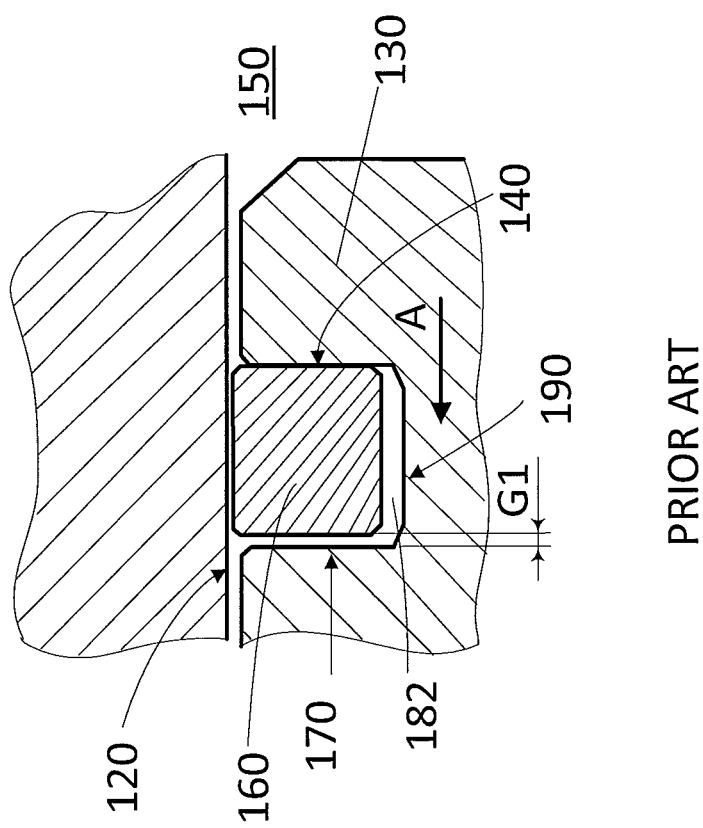
FIGURE 1A
PRIOR ART

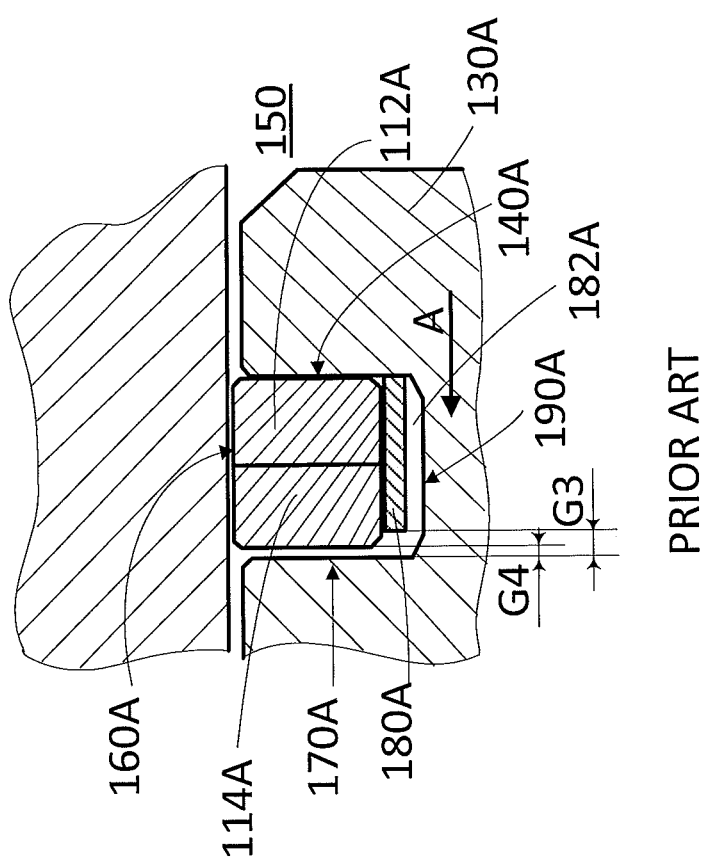
FIGURE 2
PRIOR ART

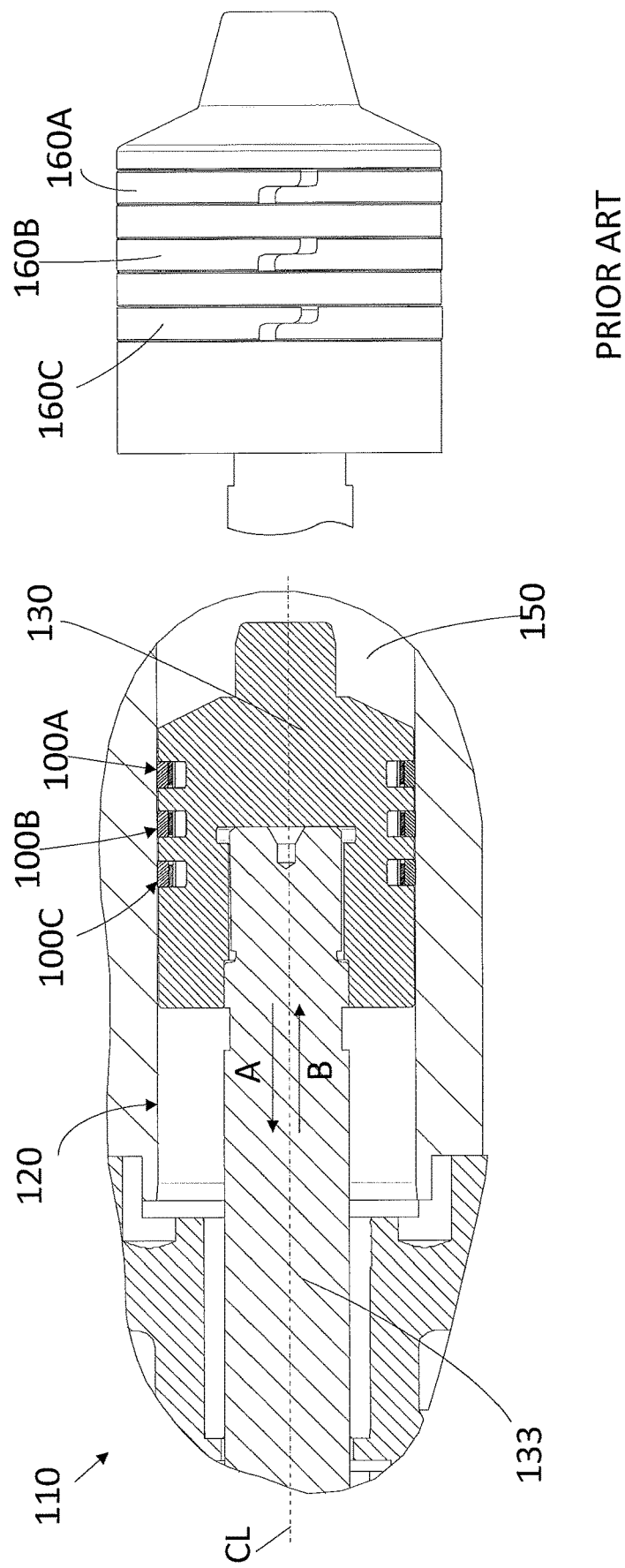
PRIOR ART
FIGURE 4
PRIOR ART
FIGURE 3

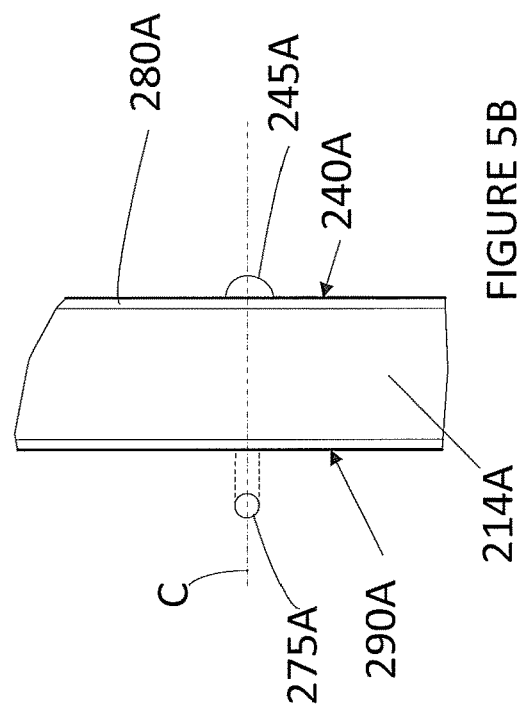
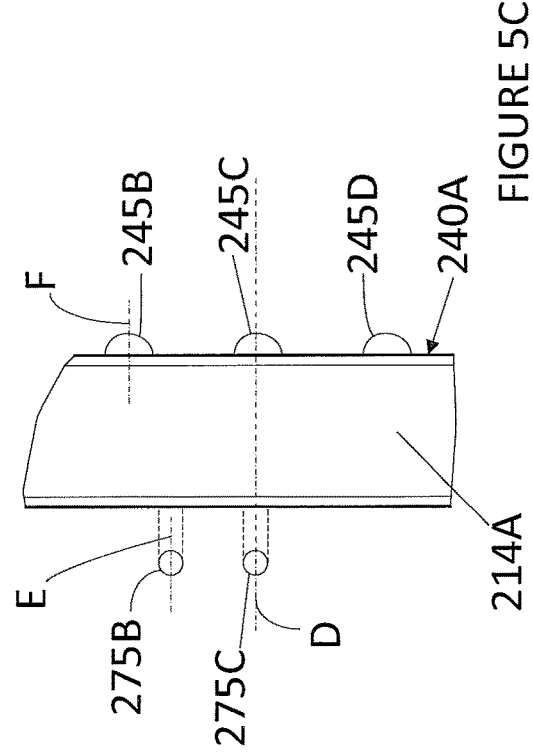
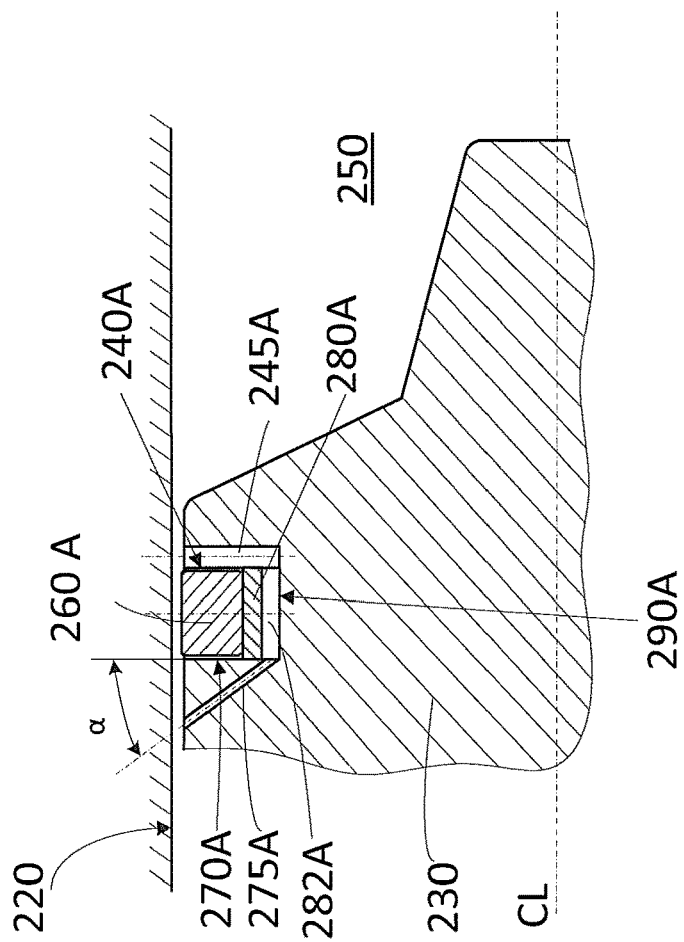
FIGURE 5B
FIGURE 5C
FIGURE 5A

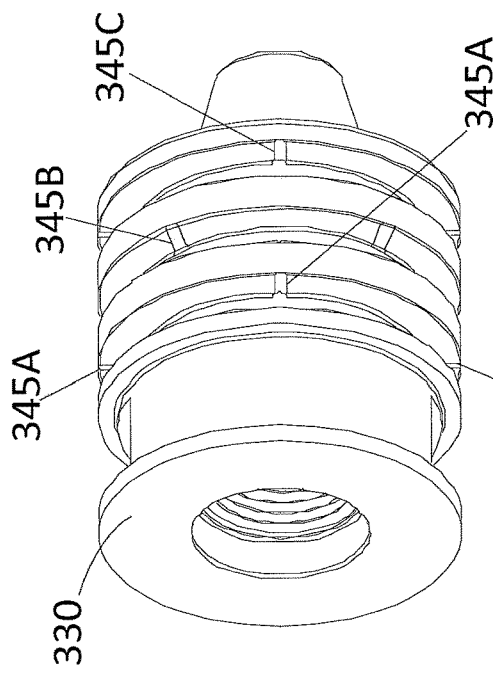
FIGURE 6B
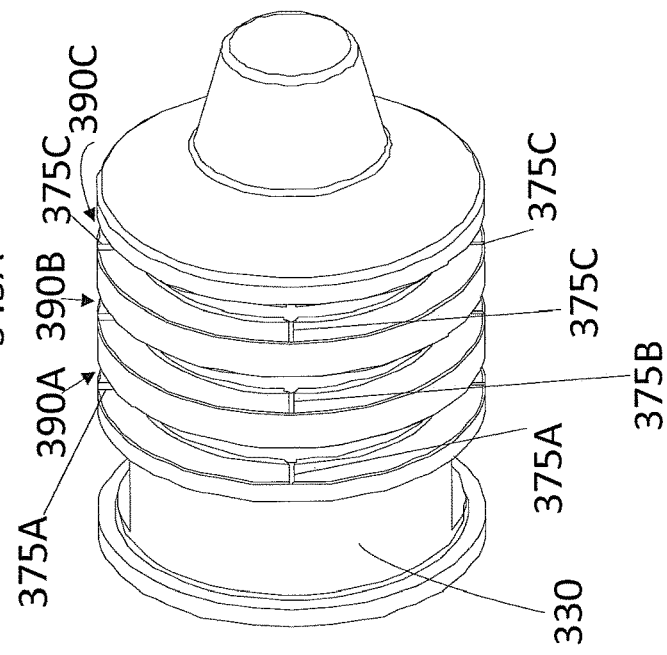
FIGURE 6C
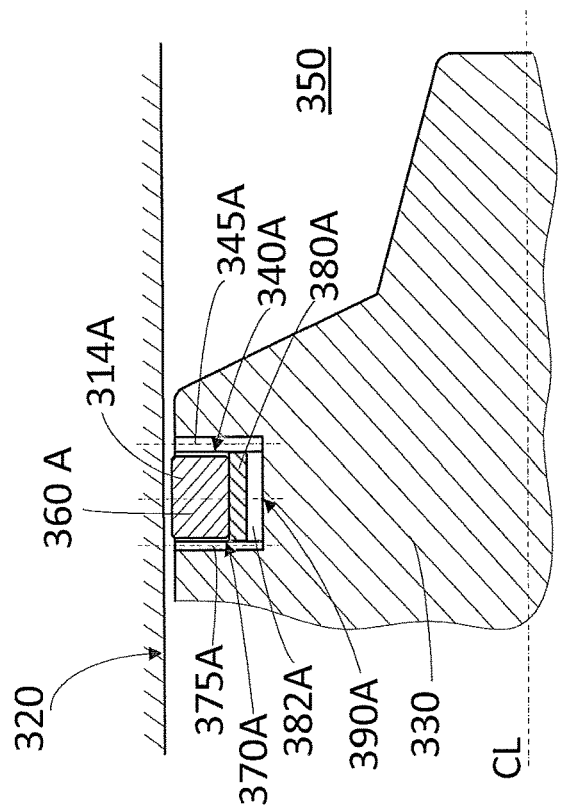
FIGURE 6A

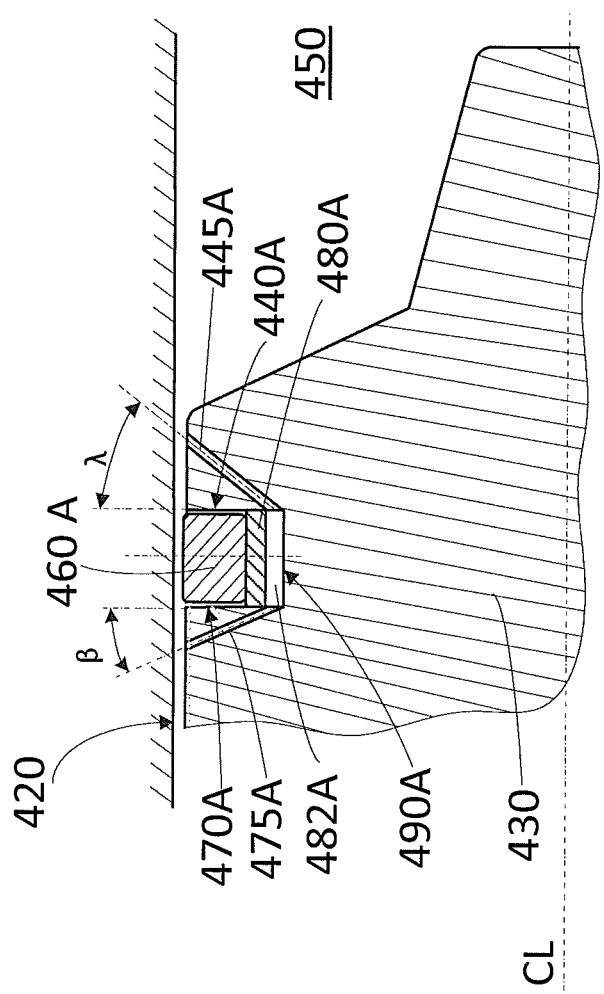
FIGURE 7

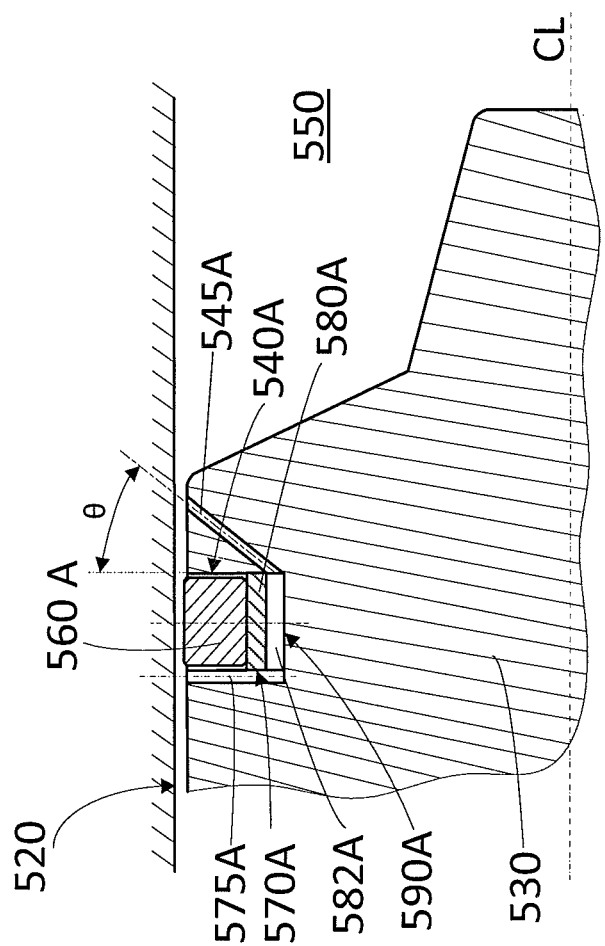
FIGURE 8

PISTON ARRANGEMENT

FIELD OF THE INVENTION

The present invention relates to a piston arrangement that allows a controlled fluid flow around seals.

BACKGROUND OF THE INVENTION

Pistons that reciprocate within a cylinder bore are well known in the art and have been long used for pumps, hydraulic drives, engines, pneumatic drives and other hydraulic or pneumatic machines that compress fluids and/or deliver different fluids at increased pressure. When the piston is moving within the cylinder, a piston seal or a piston seal assembly is employed for dynamic sealing to inhibit or prevent fluid from leaking between the piston and the cylinder walls.

Piston seals are subjected to substantive wear due to the piston's movement within the cylinder bore and sometimes they fail due to excessive wear and/or due to the stress caused by the pressure exerted on the seal by the fluid being compressed. Such operating conditions can be even more challenging in the case of high pressure reciprocating pumps and/or in the case of pumps handling cryogenic fluids.

An example of such a reciprocating pump is a pump used to deliver a liquefied gaseous fuel from a cryogenic vessel to a gaseous-fuelled internal combustion engine. Such pumps can handle fluids at relatively high pressures, around 4600 psi, and at low temperatures, for example at around −130 degrees Celsius and lower. It is difficult to provide an effective seal for the piston of such a pump especially because the material of the seal has to withstand the low temperatures of the pumped fluid and the high compression stresses acting on the seal. Also, the different contraction coefficients of the materials from which the pump components and the seals are made can result in gaps being formed between the piston seals and the cylinder wall allowing fluid to leak from the compression chamber past the piston seal to the low pressure side of the pump.

As illustrated in FIGS. 1A and 1B, for such reciprocating pumps, seal 160 is provided generally in piston groove 190 to seal piston 130 against bore 120 of the pump cylinder where piston 130 reciprocates. Because of the dimensional variances introduced by manufacturing tolerances of the seal and of the piston groove and because of the pressure exerted on the seal by the fluid in the compression chamber, there can be variability in the position of seal 160 within the piston groove. Seal 160 can move in an axial direction, in the direction of arrows A and B respectively, within the piston groove. The piston groove is formed by two opposing lateral walls, a forward lateral wall 140, which is closer to compression chamber 150, and a rear lateral wall 170 that is closer to the drive shaft of the piston, and a bottom surface that connects between the two lateral walls. For example, as illustrated in FIG. 1A, when piston 130 moves in direction "A" during the intake stroke of the pump, seal 160 is urged towards forward lateral wall 140 of the piston groove creating a gap G1 between the seal and rear lateral wall 170 of the piston groove through which fluid can flow. When the pump piston reverses direction for a compression stroke and piston 130 moves in direction "B", seal 160 is urged towards rear lateral wall 170 of piston groove 190 and fluid can leak from compression chamber 150 through gap created between seal 160 and forward lateral wall 140 and flow into space 182, underneath seal 160 and then through gap G2, between rear lateral wall 170 and seal 160. As seen in FIGS. 1A and 1B, the size of the gap created between seal 160 and rear lateral wall 170 of the piston groove during the reciprocating movement of the piston within the cylinder bore can vary, for example between G1 and G2. Similarly the space created between forward lateral wall 140 of the piston groove and seal 160 can also vary during the piston movement. The variations in size of the gaps and spaces created around the seal in the piston groove cause some variation in the fluid pressure within space 182, underneath the seal, which varies the force urging the seal into contact with cylinder bore 120. This variation in the force urging the seal into contact with the bore affects the wear of the seal. The variation in size of the gaps and spaces created around the seal within the piston groove also influences the pressure drop across the seal, which is another factor that influences the seal wear.

For reciprocating pumps in general, seal wear due to the reciprocating movement of the piston is a problem that needs to be addressed. In the past, split seals have been used to address the problem of seal wear. Split seals have the shape of a ring having a cut that allows it to be installed on the piston and more importantly it allows the seal to expand to compensate for the seal wear. For maintaining the contact between the seal and the pump cylinder wall a seal energizer is provided for supporting the seal and pushing it towards the cylinder wall. The seal energizer can be a metal ring that is positioned underneath the seal that forms together with the seal a piston seal assembly that is placed in a piston groove. The seal energizer is split transversally such that there is a gap between the free ends of the ring that provides for an easier installation of the seal energizer in the piston groove and provides a more elastic force for pushing the seal towards the cylinder wall when the seal assembly is installed in the piston groove.

Generally there is a clearance gap between the seal energizer and the lateral walls of the piston groove where the seal assembly is positioned. A gap facilitates installation and the size of the gap can vary depending upon the specified acceptable manufacturing tolerances. For example, in some cases, the dimensions of the gap can vary by more than 0.15 mm. The size of the gap between the seal energizer and the lateral walls of the piston groove can be controlled only through tight manufacturing tolerances and such gap represents a potential seal leak path that can affect the life span of the seal. Like seal 160, the energizer can also move within the piston groove in the axial direction during the reciprocating movement of the piston within the cylinder bore causing the size of the clearance gaps between the seal energizer and the lateral walls of the piston groove to vary. It has been found that the axial position of the seal energizer within the piston groove, together with the axial position of the seal within the groove, influence the size of the leakage area through the seal that affects the pressure drop across the seal. As illustrated for example in FIG. 2, split seal 160A comprises two overlapping end segments 112A and 114A, supported by energizer 180A within piston groove 190A of piston 130A. If seal energizer 180A is positioned closer to forward lateral wall 140A that is closer to the higher pressure side of the piston, which is the side closer to the compression chamber 150, the leak path between the seal energizer and rear lateral wall 170A, which is closer to the low pressure side of the piston, allows a bigger gap G3 and implicitly a larger leak area compared to the leak path through the seal assembly when seal energizer 180A is positioned axially in the centre of groove 190A or when seal energizer 180A moves closer to rear lateral wall 170A. The combined effect of dynamic changes in gap G3 between seal energizer 180A and rear lateral wall 170A and gap G4 between seal 160A and rear lateral wall 170A is that the fluid pressure within space 182A underneath the energizer and the pressure drop across the seal assembly vary during pump operation, causing the wear of seal 114A to be inconsistent over time.

Furthermore, if several seal assemblies, each comprising a seal and a seal energizer, are mounted in series for sealing the piston as it reciprocates within the pump cylinder, it has been observed that some seals show substantially more wear than others with at least one random seal failing after some time. This can be explained by the fact that the pressure drop across each seal varies. The pressure drop across each seal depends on the size of the leak path area through the seal, and seals with the smallest leak path area experience the greatest pressure drop due to the highest resistance to fluid pressure and will wear faster. The replacement of worn seals requires taking the apparatus out of service, removing the piston and replacing the seals.

Accordingly, there is a desire to continually improve the life of the piston seals to increase the time between service intervals, improving seal wear consistency over time.

SUMMARY OF THE INVENTION

A piston arrangement comprises a piston body having a cylindrical surface and circumferential piston groove in the piston body for accommodating a seal that seals between the piston and a cylinder in which the piston is reciprocable. The piston body comprises a first fluid flow passage, defined at least in part by the piston body, which connects a forward side of said cylindrical surface of the piston body with a space within the piston groove defined in part by a bottom surface of the piston groove and by the seal, when the seal is placed in the piston groove. The piston body further comprises a second fluid flow passage, defined at least in part by the piston body, which connects a rearward side of the cylindrical surface of the piston body with the space defined by the bottom surface of the piston groove and the seal. The first and second fluid flow passages are sized to allow a predetermined amount of fluid flow.

The first fluid flow passage can be defined by a channel provided in a forward lateral wall of the piston groove or by an orifice provided in the piston body. The longitudinal axis of the orifice defining the first fluid flow passage provided in the piston body is angled from between zero and ninety degrees measured from the plane defined by the forward lateral wall of the piston groove. The channel defining the first fluid flow passage is generally oriented in a radial direction from a centerline of the piston body.

The second fluid flow passage can be defined by a channel provided in a rear lateral wall of the piston groove or by an orifice provided in the piston body. The longitudinal axis of the orifice defining the second fluid flow passage provided in the piston body is angled from between zero and ninety degrees measured from the plane defined by the rear lateral wall of the piston groove. The channel defining the second fluid flow passage is oriented in a radial direction from a centerline of the piston body.

The orifices defining the first or the second fluid flow passage preferably have a circular cross-sectional flow area.

The channels defining the first or the second fluid flow passage preferably have a semicircular cross-sectional flow area.

In preferred embodiments, a cross-sectional flow area of the second fluid flow passage is smaller than a cross-sectional area of the first fluid flow passage.

In some embodiments, the first fluid flow passage is situated in the same cross-sectional plane of the piston body as the second fluid flow passage, while in other embodiments the first fluid flow passage is situated in a different cross-sectional plane of the piston body than the second fluid flow passage.

In some embodiments, the piston arrangement further comprises at least one other fluid flow passage defined at least in part by the piston body that connects the forward side of the cylindrical surface of the piston body with the space defined in part by a bottom surface of the piston groove and by the seal, when said seal is placed in said piston groove, and at least one other fluid flow passage defined at least in part by the piston body that connects the rearward side of said cylindrical surface of the piston body with the space underneath the seal.

In these embodiments, the number of fluid flow passages that connect the forward side of the cylindrical surface of the piston body with the space underneath the seal can be different than the number of fluid flow passages that connect the rearward side of the cylindrical surface of the piston body with the space underneath the seal. Each of the fluid flow passages that connect the forward side of the cylindrical surface of the piston body with the space underneath the seal is defined by a channel provided in the forward lateral wall of said piston groove or by an orifice provided in the piston body. Each of the fluid flow passages that connect the rearward side of the cylindrical surface of the piston body with the space underneath the seal is defined by a channel provided in the rear lateral wall of the piston groove or by an orifice provided in the piston body.

The present piston arrangement can comprise a split seal situated in the circumferential piston groove, the split seal having two overlapping ends.

In some embodiments, the seal is a seal assembly that comprises a seal and an energizer that supports the seal, the seal assembly being situated in the circumferential piston groove. In the proposed embodiments, for the first and second fluid flow passages to control fluid flow around the piston seal assembly, alternative leak paths through the seal are made more restrictive. For example, in some embodiments, a select fit manufacturing method is employed to reduce the clearance gap between the energizer and the piston groove. "Select fit" describes a manufacturing process where energizers with varying widths can be selected by the assembler so that the clearance gap is reduced without being too tight to inhibit the energizers ability to contract and expand in diameter.

BRIEF DESCRIPTION OF THE DRAWINGS

FIGS. 1A and 1B (Prior Art) are schematic cross-sectional representations of a piston seal located in a piston groove of a reciprocating pump, which illustrate the different axial positions of the seal within the piston groove during the reciprocal movement of the piston within the pump cylinder;

FIG. 2 (Prior Art) is a schematic cross-sectional representation of a piston seal assembly comprising a seal and an energizer, located in a piston groove of a reciprocating pump, which illustrates one of the different axial positions of the seal energizer within the piston groove during the reciprocal movement of the piston within the pump cylinder;

FIG. 3 (Prior Art) is a schematic cross-sectional representation of a reciprocating pump having a piston comprising a series of piston seal assemblies;

FIG. 4 (Prior Art) is a view of the piston illustrated in FIG. 3 showing the series of S-cut seals;

FIG. 5A is a cross-sectional view of a portion of a piston according to a preferred embodiment where one lateral wall of the piston groove is provided with at least one channel and the piston body comprises at least one orifice for controlling fluid flow around the seal assembly;

FIGS. 5B and 5C each show a top view of a seal positioned in a piston groove and represent different possible arrangements of channels and orifices for the piston arrangement illustrated in FIG. 5A;

FIG. 6A is a cross-sectional view of a portion of a piston with a piston groove having lateral walls shaped with at least one channel on each of the lateral walls of the piston groove for controlling fluid flow around the seal assembly;

FIGS. 6B and 6C show perspective views of the embodiment illustrated in FIG. 6A.

FIG. 7 is a cross-sectional view of a portion of a piston having a body provided with two orifices that connect the space underneath the seal assembly within the piston groove with the rear and respectively the forward side of the piston for controlling fluid flow around the seal assembly.

FIG. 8 is a cross-sectional view of a portion of a the piston having a body provided with an orifice to connect the forward side of the piston with the space underneath the seal assembly within the piston groove and wherein a lateral wall of the piston groove is provided with a channel for controlling fluid flow around the seal assembly.

DETAILED DESCRIPTION OF PREFERRED EMBODIMENT(S)

The present piston design was developed for reciprocating cryogenic piston pumps that have some particular characteristics that require improved design features. The improved piston design is described herein in the context of this application. Nevertheless aspects of the present piston design can be applied to improve seal life for many different applications for pistons that move within a cylinder bore in a reciprocal movement.

The present piston seals are illustrated as seal assemblies comprising a split seal and a seal energizer positioned underneath the seal. Nevertheless the teachings of the present piston design can be applied to improve seal life for seals of a conventional configuration, known in the prior art, which are located within the piston groove without being supported by an energizer.

FIG. 3 illustrates a partial cross-section view of a reciprocating pump 110, of a type generally known in the prior art. While the whole pump is not shown, FIG. 3 is focused on the piston and seal arrangement. The pump comprises a cylinder bore 120, defined by the body of the pump, and a piston 130 that is actuated by an actuating mechanism (not illustrated) through a drive shaft 133 such that it has a reciprocating movement within cylinder bore 120. When piston 130 moves in direction "A" it draws fluid into compression chamber 150 through the pump's intake port (not shown), during the intake stroke, and when piston 130 moves in the opposite direction B, the intake port is closed and the pump compresses the fluid within compression chamber 150, during the compression stroke of the pump.

Piston 130 comprises a series of seal assemblies 100A, 100B and 100C. Each seal assembly comprises a seal and a seal energizer supporting the seal, which are better illustrated in FIGS. 5A, 6A, 7 and 8. Seals 160A, 160B and/or 160C can have a split configuration as illustrated FIG. 4 with two free end segments that overlap.

The type of seal energizer illustrated in FIGS. 3, 5A, 6A, 7 and 8 is a type that is known to be used with seal assemblies comprising a split seal, sometimes known as an "S-cut" seal, to allow the seal to remain in close proximity to the cylinder wall when the outer circumferential surface is worn, thereby maintaining a good seal between the piston and the cylinder wall.

FIG. 5A illustrates a preferred embodiment of the present piston arrangement that comprises a piston body 230. The piston, which moves within cylinder bore 220, further comprises split seal 260A and energizer 280A, both located in piston groove 290A as described above. Forward lateral wall 240A of piston groove 290A, comprises a channel 245A that connects the space 282A underneath the energizer 280A, which is partially defined by the bottom surface of piston groove 290A, with the forward side of the cylindrical surface of the piston, towards compression chamber 250, and piston body 230 further comprises an orifice 275A that connects the rearward side of the cylindrical surface of the piston, towards the piston drive shaft, with space 282A. Channel 245A is preferably shaped as a channel of a semi-circular cross-section whose longitudinal axis is oriented radially from the centerline "CL" of the piston body. Channel 245A can have other cross-sectional shapes, and preferably has a shape that is readily manufactured and allows a consistent open flow area for the controlled flow of fluid. Orifice 275A has a longitudinal axis that extends from the cylindrical surface of the piston to near the bottom of the piston groove. In the illustrated embodiment, the longitudinal axis of orifice 275A forms an angle α with the surface of rear lateral wall 270. Orifice 275A can have a circular cross-section that is readily drilled or other shape that is readily manufactured and that allows a consistent flow area for the controlled flow of fluid.

The cross-sectional area of orifice 275A is preferably smaller than the cross-sectional area of channel 245A, such that the flow of fluid from the space underneath the seal, within the piston groove, to the rearward side of the cylindrical surface of piston body 230 is better controlled. The angle α determines the length of the fluid flow passage and therefore is one parameter that can be chosen to achieve the desired fluid flow amount through the seal assembly. For pistons that are provided with more than one circumferential piston grooves, angle α can vary for each set of the orifices corresponding to each one of the piston grooves.

In FIG. 5A, for illustrative purposes, channel 245A and orifice 275A are situated in the same cross-sectional plane of the piston body. As further shown in FIG. 5B, channel 245A and orifice 275A share a common alignment with axis C. In other embodiments, channel 245A could be offset from orifice 275A so that each of them is situated in a different cross-sectional plane of the piston body. In other embodiments, each lateral wall of the piston groove can be provided with more than one channel, and respectively the piston body can be provided with more than one orifice for connecting the forward side of the piston to the space underneath the seal and the axis of the channels and that of the orifices can be aligned or not. For example, as illustrated in FIG. 5C one of the channels 245C provided on forward lateral wall 240A is aligned with one of the orifices 275C, both sharing centerline D, while other channels, 245B and 245D, are not aligned with orifices 275B or 275C. Furthermore, in some embodiments the number of channels provided in the lateral wall of the piston groove is different than the number of orifices provided for a controlled fluid flow. As illustrated in FIG. 5C forward lateral wall 240A is provided with three channels 245B, 245C and 245D and the piston body further comprises only with two orifices 275B and 275C. The number of the orifices and channels, their placement and their size are parameters that can be designed to achieve a desired amount of fluid flowing through the seal assembly. In preferred embodiments, the orifices and the channels are evenly spaced along the circumference of the piston body on each lateral wall of a piston groove.

Furthermore, if the piston is provided with more than one seal assembly, as illustrated for example in FIGS. 3 and 4, the number of orifices and channels, their size and their placement can vary for each seal assembly, such that the fluid flow around each seal is controlled to maintain the same pressure drop across each seal assembly. In other applications it might be desired to have a different predetermined pressure drop across each seal assembly and this can be achieved by adjusting the size of the orifices and/or channels associated with each seal assembly.

FIGS. 6A, 6B and 6C illustrate a second embodiment of the present piston design. The seal assembly consisting of seal 360A and energizer 380A is located in a piston groove 290A and seals between piston body 330 and cylinder bore 320. Forward lateral wall 340A of piston groove 390A comprises a channel 345A that connects the space 382A underneath the energizer 380A with the forward side of the cylindrical surface of the piston body, towards compression chamber 350, and rear lateral wall 370A of piston groove 390A further comprises a channel 375A that connects space 382A with the rearward side of the cylindrical surface of the piston body, towards the drive portion of the piston connected to the piston's drive shaft. Each of the channels 345A and 375A is shown shaped as an elongated channel with a semi-circular cross-section whose longitudinal axis is oriented in a radial direction from the centerline "CL" of the piston. As described in the previous embodiment in relation with channel 245A, while shown in a preferred geometry that facilitates manufacturing, channels 345A and 375A can have other cross-sectional shapes that are also readily manufactured and that provide the same fluid flow around the seal.

The collective cross-sectional area of channel 375A and like channels on the same surface of the piston groove is preferably smaller relative to the collective cross-sectional area of channel 345A and like channels on its respective surface, such that the flow of fluid from the space underneath the seal energizer within the piston groove to the rear side of the piston is more restricted.

FIGS. 6B and 6C show perspective views of piston to illustrate the position of channels at predetermined distances along the circumference of the piston. The piston is provided with several piston grooves 390A, 390B and 390C for locating a series of seal assemblies similar to seal assembly illustrated in FIG. 6A. For each of the piston grooves, one lateral wall is provided with several channels (for example channels 345A, 345B and 345C) and the opposite lateral wall is provided with several other channels (for example channels 375A, 375B and 375C). Each lateral wall can be provided, as illustrated, with more than one channel. In preferred embodiments, the channels are evenly spaced along the circumference of the piston body on each lateral wall of a piston groove.

As described in relation to the embodiment illustrated in FIGS. 5A, 5B and 5C, the number of channels on one lateral wall of a piston groove does not have to be equal to the number of channels on the opposing lateral wall of the piston groove, and the number of channels can vary from one piston groove to another. For each piston groove the elongated channels can each have a longitudinal axis radiating from the centerline of the piston. Similar to the orientation of the orifices and channels illustrated in FIG. 5B or 5C, channel 345A need not to be in the same as channel 375A, as is shown for illustrative purposes in FIG. 6A.

FIG. 7 illustrates a third embodiment of the present piston design. Piston body 430 comprises a first orifice 445A that connects the forward side of the cylindrical surface of the piston that faces compression chamber 450, with space 482A underneath energizer 480A that cooperates with seal 460A to form a seal assembly. Piston body 430 further comprises a second orifice 475A that connects space 482A underneath energizer 480A with the rearward side of the cylindrical surface of piston body on the other side of seal 460A. Seal 460A forms a seal between the piston and cylinder bore 420 and a consistent amount of fluid is allowed to flow around seal 460A through first orifice 445A, space 482A and orifice 475A to improve the performance and durability of the seal assembly by maintaining a more consistent fluid pressure in space 482A. In preferred embodiments, seal 460A is a split seal.

In the illustrated embodiment, the longitudinal axis of orifice 445A forms an angle $\lambda$ with the surface of the forward lateral wall 440A. Orifice 475A has a longitudinal axis that forms an angle $\beta$ with the surface of the rear lateral wall 470A. Orifices 445A and 475A preferably have a circular cross-section or other shapes that are readily manufactured with precision to control fluid flow to a desired predetermined level.

The collective cross-sectional area of orifice 475A and other rear facing orifices is preferably smaller than the collective cross-sectional area of orifice 445A and other forward facing orifices, such that the flow of fluid from the space underneath the seal to the rear side of the piston is more restricted. Angles $\beta$ and $\lambda$ affect the length of the fluid passage overall and therefore are parameters that can be controlled to achieve the desired fluid flow amount through the seal assembly. For pistons that are provided with more than one seal assembly angles $\beta$ and $\lambda$ can be different for each of the associated seal assemblies.

In the illustrated embodiment orifices 445A and 475A are situated in the same plane. Alternatively, they can be situated in different planes and distributed at different locations along the circumference of the piston. Similarly to what was described in relation to the previous embodiments, the number of orifices that connect the forward side of the cylindrical surface of the piston to the space underneath the energizer, within the piston groove, does not have to be equal to the number of orifices that connect the space underneath the energizer to the rearward side of the cylindrical surface of the piston. In preferred embodiments, the orifices are evenly spaced along the circumference of the piston body.

Furthermore, if the piston is provided with more than one seal assembly, as illustrated for example in FIGS. 3 and 4, the number of orifices, their size and their placement can vary for each seal assembly, such that the fluid flow around each seal assembly is controlled to maintain the same pressure drop across each seal assembly. In other applications it might be desired to have a different predetermined pressure drop across each seal assembly and this can be achieved by adjusting the size of the orifices for each seal assembly.

FIG. 8 illustrates a fourth embodiment of the present piston design. The body of the piston 530 comprises a first orifice 545A that connects the forward side of the cylindrical surface of the piston body that is closer to compression chamber 550 with space 582A underneath energizer 580A that cooperates with seal 560A to form a seal assembly. Rear lateral wall 570A of piston groove 590A is shaped with a channel 575A that connects space 582A underneath energizer 580A with the rearward side of the cylindrical surface of the piston body.

Orifice 545A has a longitudinal axis that forms an angle θ with forward lateral wall 540A of piston groove 590A. Orifice 545A and channel 575A preferably have respective circular and semicircular cross-sections, but they can have other shapes that are readily manufactured and allows a precise cross-sectional flow area for regulating fluid flow.

As in the previous embodiments angle θ affects the length of the fluid passage through the seal assembly and is therefore controlled to achieve the desired fluid flow amount. For pistons that are provided with more than one seal assembly angle θ can be the same or different for each of the seal assemblies depending upon the desired pressure drop for each seal assembly.

In FIG. 8, orifices 545A and channel 575A are shown in the same plane for illustrative purposes. Alternatively, like with other embodiments, they can be situated in different planes and distributed at different locations along the circumference of the piston. Similarly to what was described in relation to the previous embodiments the number of orifices that connect the forward side of the cylindrical surface of the piston to the space underneath the energizer within the piston groove does not have to be equal to the number of orifices that connect the space underneath the energizer to the rearward side of the cylindrical surface of the piston. In preferred embodiments, the orifices and the channels are evenly spaced around the circumference of the piston body on each lateral wall of a piston groove.

Furthermore, like with other embodiments, if the piston is provided with more than one seal assembly, as illustrated for example in FIGS. 3 and 4, the number of orifices and channels, their size and their placement can vary for each seal assembly, such that the flow around each seal assembly is controlled to maintain the desired pressure drop across each seal assembly when the pump is operating. By way of example, for a reciprocating pump that handles a gaseous fuel in liquefied form when there are a plurality of piston grooves and seals, the cross-sectional area of the fluid flow passages associated with the piston grooves disposed towards the rearward side of the piston closer to the piston's drive shaft can be larger than that of the fluid flow passages that are disposed toward the forward side of the piston that is closer to the compression chamber to compensate for decrease in density of the fluid if it vaporizes.

The cross-sectional area and the length of the orifices and of the channels for the embodiments of the present piston design can be calculated such that a predetermined pressure drop is achieved across the seal assembly, based upon the known characteristics of the pump, including its geometry, the type of fluid, and the pressure generated in the compression chamber when the pump is operating normally, even for pistons that are provided with only one piston groove.

The figures in the present disclosure are intended for illustrative purposes and are not drawn to scale. For example, some features such as the orifices in the piston body and the channels in the wall of the piston grooves may be enlarged relative to the other components to better illustrate their function and their relative dimensions. In addition, the figures do not show all of the physical details of the reciprocating pump and its various components.

In the figures of the present disclosure like components between different embodiments have like reference numerals and may have not been described in detail, if at all.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A piston arrangement comprising:
   (a) a piston body having an outer cylindrical surface;
   (b) a circumferential piston groove in said piston body, said piston groove formed by two opposing lateral walls, a forward lateral wall and a rear lateral wall, and an inner cylindrical bottom surface that connects between said two opposing lateral walls; said piston groove suitable for accommodating a seal between said two opposing lateral walls of said piston groove such that said seal seals between said piston body and a cylinder in which said piston body is reciprocable;
   (c) a first fluid flow passage defined by an orifice provided in said piston body that extends through said piston body from a forward side of said outer cylindrical surface of said piston body above said forward lateral wall of said piston groove to a space within said piston groove defined in part by said inner cylindrical bottom surface of said piston groove and by said seal when said seal is placed in said piston groove; and
   (d) a second fluid flow passage defined at least in part by said piston body that connects a rearward side of said outer cylindrical surface of said piston body with said space within said piston groove;
wherein said forward side of said outer cylindrical surface of said piston body is closer to a compression chamber than said rearward side of said outer cylindrical surface of said piston body in operation and said first and second fluid flow passages are sized to allow a predetermined amount of fluid flow such that a fluid pressure drop is achieved across the seal during operation.

2. The piston arrangement of claim 1, wherein a longitudinal axis of said orifice forms an angle greater than zero and less than ninety degrees measured from a surface of said forward lateral wall of said piston groove.

3. The piston arrangement of claim 1, wherein said second fluid flow passage is defined by a channel provided on a surface of said rear lateral wall of said piston groove or by an orifice provided in said body of said piston.

4. The piston arrangement of claim 3, wherein said channel of said second fluid flow passage is oriented in a radial direction from a centerline of said piston body.

5. The piston arrangement of claim 3, wherein said orifice of said second fluid flow passage has a circular cross-sectional flow area.

6. The piston arrangement of claim 3, wherein said channel of said second fluid flow passage has a semicircular cross-sectional flow area.

7. The piston arrangement of claim 1, wherein a cross-sectional flow area of said second fluid flow passage is smaller than a cross-sectional area of said first fluid flow passage.

8. The piston arrangement of claim 1, wherein said first fluid flow passage is situated in a different cross-sectional plane of said piston body than said second fluid flow passage.

9. The piston arrangement of claim 1, further comprising at least one other fluid flow passage defined at least in part by said piston body that connects said forward side of said outer cylindrical surface of said piston body with said space and at least one other fluid flow passage defined at least in part by said piston body that connects said rearward side of said outer cylindrical surface of said piston body with said space.

10. The piston arrangement of claim 9, wherein said fluid flow passages that connect said forward side of said outer cylindrical surface of said piston body with said space are a different number than said fluid flow passages that connect said rearward side of said outer cylindrical surface of said piston body with said space.

11. The piston arrangement of claim 9, wherein each of said at least one other fluid flow passage that connects said forward side of said outer cylindrical surface of said piston body with said space is defined by a channel provided on a surface of said forward lateral wall of said piston groove or by an additional orifice provided in said body of said piston.

12. The piston arrangement of claim 11, wherein a longitudinal axis of said additional orifice forms an angle greater than zero and less than ninety degrees measured from a surface of said forward lateral wall of said piston groove.

13. The piston arrangement of claim 9, wherein each of said fluid flow passages that connect said rearward side of said outer cylindrical surface of said piston body with said space is defined by a rearward side channel provided on a surface of said rear lateral wall of said piston groove or by a rearward side orifice provided in said body of said piston.

14. The piston arrangement of claim 13, wherein a longitudinal axis of said rearward side orifice that connects said space with said rearward side of said outer cylindrical surface of said piston body forms an angle greater than zero and less than ninety degrees measured from a surface of said rear lateral wall of said piston groove.

15. The piston arrangement of claim 1, wherein said seal is a split seal with two overlapping ends, said split seal being situated in said circumferential piston groove.

16. The piston arrangement of claim 1, wherein said seal is a seal assembly that comprises a seal and an energizer that supports said seal, said seal assembly being situated in said circumferential piston groove.

17. The piston arrangement of claim 16, further comprising said energizer being chosen by a select fit manufacturing process for reducing a clearance gap between said energizer and said piston groove.

18. The piston arrangement of claim 1, wherein said piston arrangement is in a reciprocating pump.

19. The piston arrangement of claim 1, wherein said piston arrangement is in a reciprocating cryogenic piston pump.

20. A piston arrangement comprising:
(a) a piston body having an outer cylindrical surface;
(b) a circumferential piston groove in said piston body, said piston groove formed by two opposing lateral walls, a forward lateral wall and a rear lateral wall, and an inner cylindrical bottom surface that connects between said two opposing lateral walls; said piston groove suitable for accommodating a seal between said two opposing lateral walls of said piston groove such that said seal seals between said piston body and a cylinder in which said piston body is reciprocable;
(c) a first fluid flow passage defined by an orifice provided in said piston body that extends through said piston body from a forward side of said outer cylindrical surface of said piston body above said forward lateral wall of said piston groove to a space within said piston groove defined in part by said inner cylindrical bottom surface of said piston groove and by said seal when said seal is placed in said piston groove; and
(d) a second fluid flow passage defined at least in part by said piston body that connects a rearward side of said outer cylindrical surface of said piston body with said space within said piston groove;

wherein said forward side of said outer cylindrical surface of said piston body is closer to a higher pressure side of the piston than said rearward side of said outer cylindrical surface of said piston body in operation and said first and second fluid flow passages are sized to allow a predetermined amount of fluid flow such that a fluid pressure drop is achieved across the seal during operation.

\* \* \* \* \*